(12) United States Patent
Esterberg

(10) Patent No.: US 6,459,575 B1
(45) Date of Patent: Oct. 1, 2002

(54) COOLING MODULE FOR PORTABLE COMPUTER

(75) Inventor: Dennis R Esterberg, Philomath, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/858,168

(22) Filed: May 15, 2001

(51) Int. Cl.⁷ .................................................. G06F 1/20
(52) U.S. Cl. ....................... 361/687; 361/695; 361/704; 165/185; 174/121
(58) Field of Search .................... 361/687, 694–697, 361/704; 165/80.3, 185, 104.33, 121–126; 174/15.2, 16.3; 439/485, 487; 454/184

(56) References Cited

U.S. PATENT DOCUMENTS

| | | | | |
|---|---|---|---|---|
| 5,898,568 A | | 4/1999 | Cheng | 361/695 |
| 5,898,569 A | * | 4/1999 | Bhatia | 361/700 |
| 5,982,616 A | | 11/1999 | Moore | 361/687 |
| 6,118,654 A | * | 9/2000 | Bhatia | 361/687 |
| 6,239,970 B1 | * | 5/2001 | Nakai et al. | 361/695 |

* cited by examiner

*Primary Examiner*—Darren Schuberg
*Assistant Examiner*—Hung Van Duong

(57) ABSTRACT

An external cooling module is removably coupled to a portable computer. A heat sink absorbs heat within the computer case. The cooling module includes a heat pipe which inserts into the heat sink and moves the heat from the portable computer into the cooling module, where it is dissipated to the external environment. Where the module includes a fan, power is provided by either a resident source, the portable computer, or an AC adapter.

16 Claims, 5 Drawing Sheets

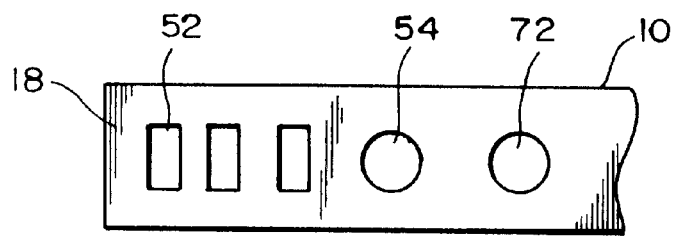
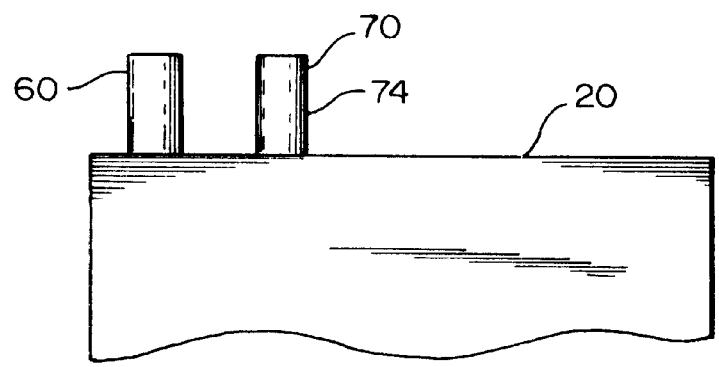
FIG. 6
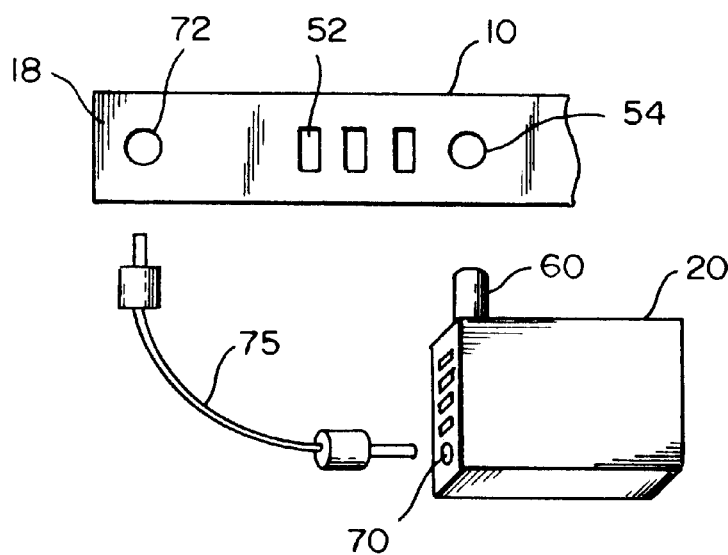
FIG. 7

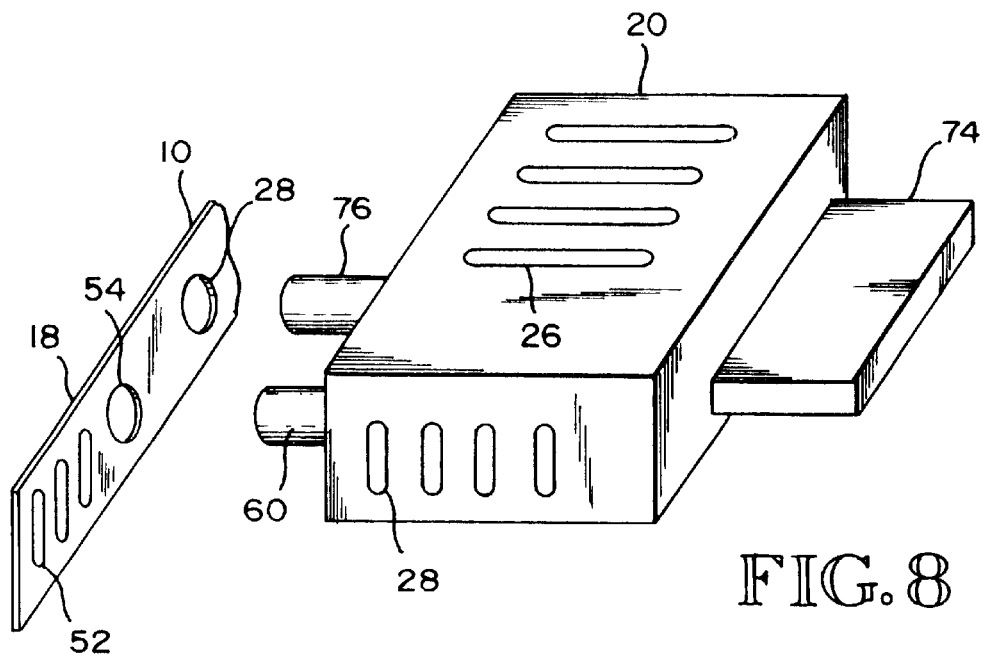
FIG. 8
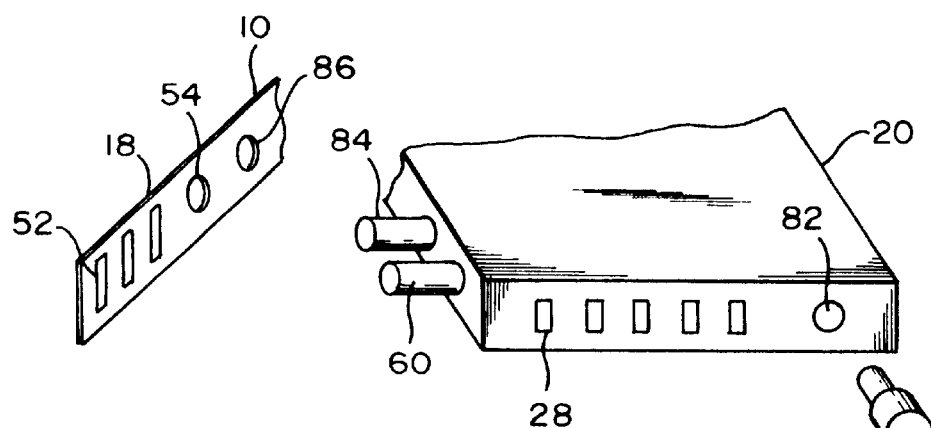
FIG. 9
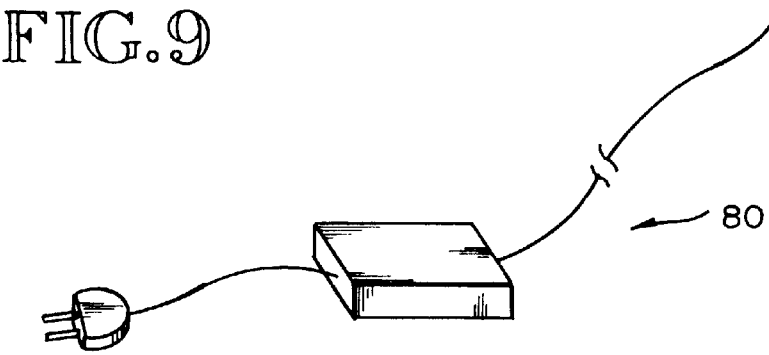

COOLING MODULE FOR PORTABLE COMPUTER

BACKGROUND OF THE INVENTION

This invention relates generally to methods and apparatus for cooling computer devices, and more particularly to cooling portable computer devices.

This invention addresses the problem of how to achieve cooling for increasingly smaller portable computers having increasingly larger power needs. Providing cooling solutions for increasingly powerful, yet smaller and more portable, computers is a challenge. The difficulties arise from the decreased form factor of portable computers, the more densely packaged environment within the portable computer case, and the need for an increased amount of power to be delivered.

Advances in technology enable smaller computers to include increasingly more features. Portable computers including notebook computers, sub-notebook computers, palm-top computers and handheld computers are exemplary portable computers which are receiving increasing features. Accompanying this increase in features is an increase in the need for power. Associated with the increased power is an increased generation of heat. Specifically, there is a need to dissipate the heat generated by computing devices so that the computing devices operate safely within optimal temperature limits.

SUMMARY OF THE INVENTION

According to an aspect of the invention, an external cooling module is removably coupled to a portable computer. Heat flows from within the portable computer to the external cooling module where it is dissipated to the external environment.

In embodiments where the cooling module requires power, the power is provided by either a resident source, the portable computer, or an AC adapter, according to a specific embodiment.

One aspect of the invention is that the increased cooling ability is achieved when desired (i.e., when the cooling module is attached and operated). Another aspect is that the cooling module is configured in some embodiments with the AC adapter. The AC adapter provides power to both the computer and the cooling module in such embodiment. This allows the computer to have increased cooling ability while it is operated in an increased power mode. Another aspect is that the cooling module in some embodiments provides a resident power source which can serve as a back-up power source for the portable computer.

Another aspect of this invention is that the cooling module in some embodiments receives power from the portable computer. This allows the operator the flexibility to decide whether to use the cooling module only when in high power mode or also in low power mode. Aspects of the invention will be better understood by reference to the following detailed description taken in conjunction with the accompanying drawings.

BRIEF DESCRIPTION OF THE DRAWING

FIG. 6 is a partial planar diagram of a power connection between the portable computer and the cooling module;

FIG. 7 is a partial planar diagram of an alternative power connection between the portable computer and cooling module;

FIG. 8 is a partial diagram of a cooling module and portable computer, in which the cooling module has a resident power source; and FIG. 9 is a partial diagram of a cooling module and portable computer, in which an AC adapter provides a power signal to the cooling module for use by the cooling module alone, or both the cooling module and the portable computer.

DESCRIPTION OF SPECIFIC EMBODIMENTS

Figure 1:
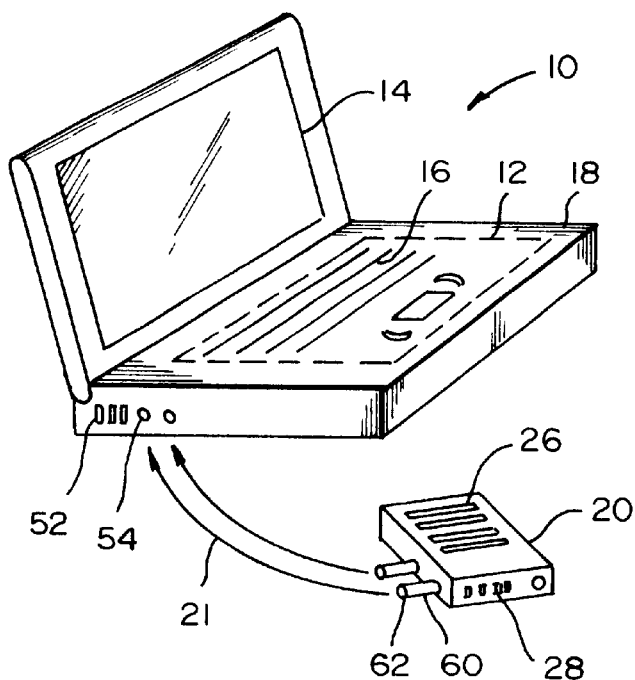
FIG. 1 is a perspective view of a portable computer with an external cooling module.
Figure 2:
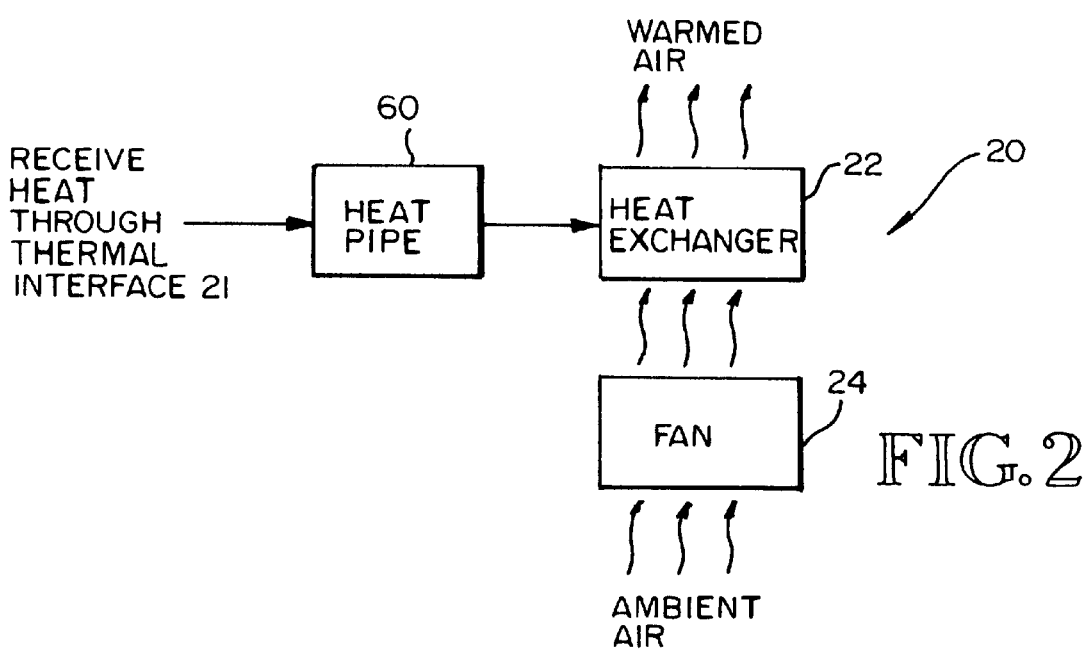
FIG. 2 is a functional block diagram of an embodiment of the cooling module.

Referring to FIG. 1, a portable computer 10 includes a microcomputer 12 with a display 14 and keyboard 16 housed in a computer case 18 which forms an external surface of the computer 10. An external cooling module 20 plugs into the portable computer to provide a thermal interface 21. Heat generated by the microcomputer 12 and other electrical components housed within the computer case 18 generate heat. The external cooling module 20 receives a portion of the heat through the thermal interface 21. Referring to FIG. 2, the cooling module 20 includes a heat exchanger 22 (e.g., a heat sink) with a large surface area and a fan 24. The fan 24 moves ambient air from the external environment into the cooling module 20 intake vents 26 across the heat exchanger 22. The thermal exchanger 22 receives heat from the portable computer 10 through the thermal interface 21. As the fan 24 moves air across the heat exchanger 22, and the heat received from the portable computer 10 is dissipated, the passing air is warmed. The warmed air continues in motion passing from the cooling module 20 at exit vents 28.

Figure 3:
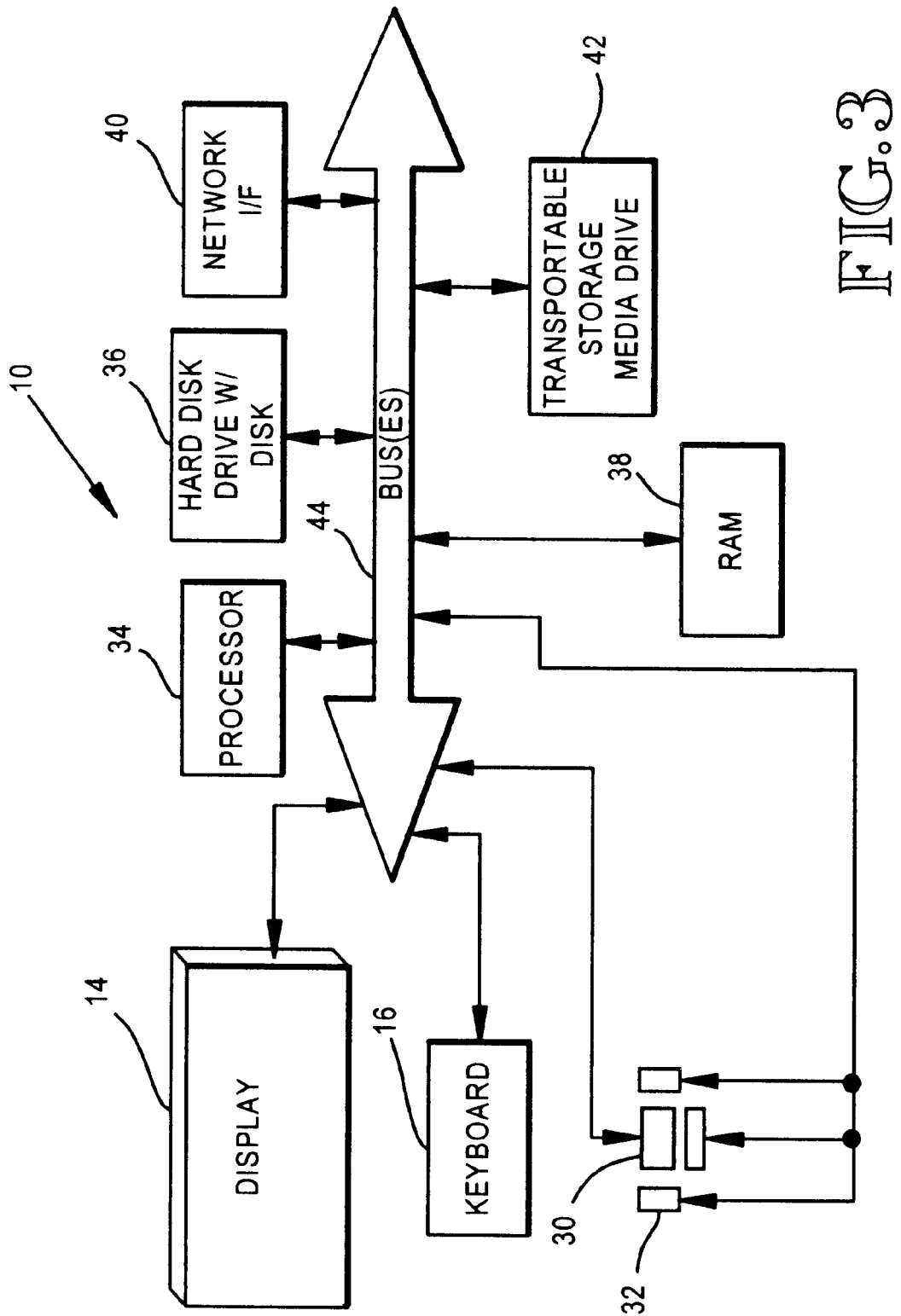
FIG. 3 is a block diagram of a general purpose portable computer.

In various embodiments the portable computer 10 is a notebook computer, sub-notebook computer, palmtop computer, hand-held computer, or another type of mobile or portable computing device. In each embodiment, the portable computer includes a processor and storage (referred to herein as a 'microcomputer'), a display and an input mechanism. Referring to FIG. 3 an exemplary general purpose portable computer, such as a notebook computer 10 includes a display 14, a keyboard 16, a pointing device 30, a clicking device 32, a processor 34, a hard disk drive with hard disk 36, random access memory 38, and optionally—one or more network interfaces 40 (e.g., modem, ethernet adapter, infrared adapter), one or more transportable storage media drives 42 and media (e.g., CD-ROM drive, DVD-ROM drive, floppy disk drive, zip drive, bernoulli drive). The various components interface and exchange data and commands through one or more busses 44. The portable computer 10 receives information by entry through the keyboard 16, pointing/clicking devices 30/32, the network interface 40, or another input device or input port.

Figure 4:
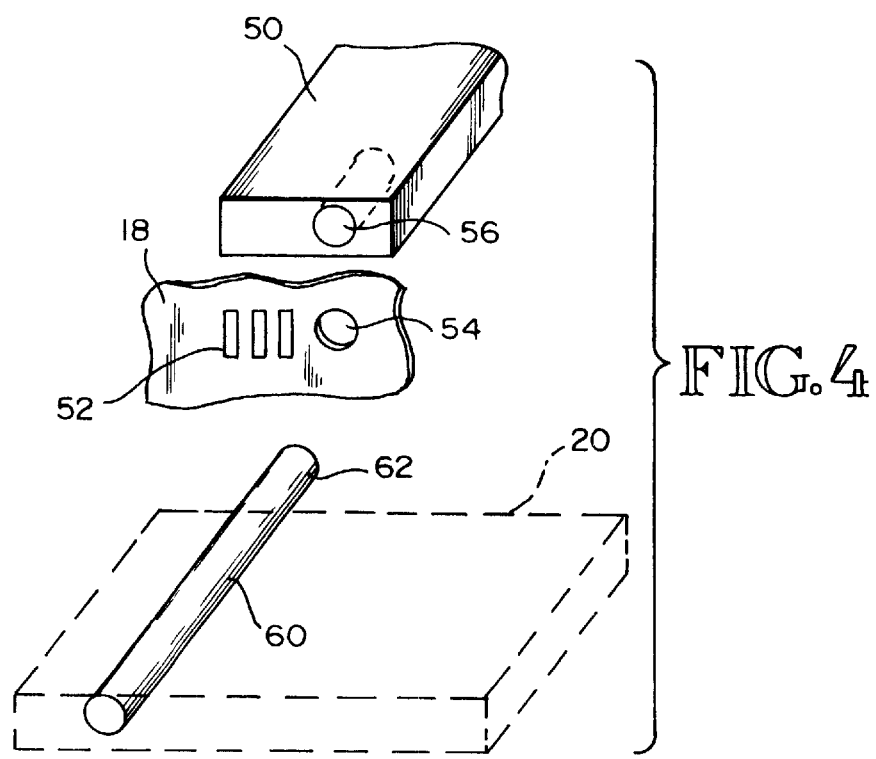
FIG. 4 is a partial diagram of a heat sink within the portable computer case and a heat pipe of the cooling module forming a thermal interface.

Referring to FIG. 4, the portable computer 10 also includes a heat sink 50 situated within the computer case 18. Although the heat sink 50 is illustrated in the shape of a bar, in various embodiments the heat sink 50 has a varied shape. Preferably the heat sink is shaped to provide a high capacity efficient heat sink function. The heat sink 50 preferably is positioned adjacent to an edge of the computer case 18. Heat generated by the microcomputer and other electrical components housed within the case 18 is absorbed by the heat sink 50 to keep the electrical components from overheating. In some embodiments the case 18 includes vented openings 52 adjacent to the heat sink allowing heat absorbed by the heat sink 50 to be dissipated to the external environment.

The case 18 includes a port 54 into which the cooling module 20 detachably connects. Although the port 54 is illustrated in FIG. 1 as being along a side edge of the case 18, in other embodiments, the port is located along the rear edge or another edge of the case 18. The port 54 is situated adjacent to the heat sink 50. In a preferred embodiment the heat sink 50 includes a corresponding opening 56 aligned with the port 54. In some embodiments the cooling module 20 also includes a heat pipe 60. The heat pipe 60 includes a portion 62 which extends arm-like from the cooling module 20. Such portion 62 is inserted into the port 54 to connect the cooling module 20 to the portable computer 10, and more specifically to the heat sink 50.

Figure 5:
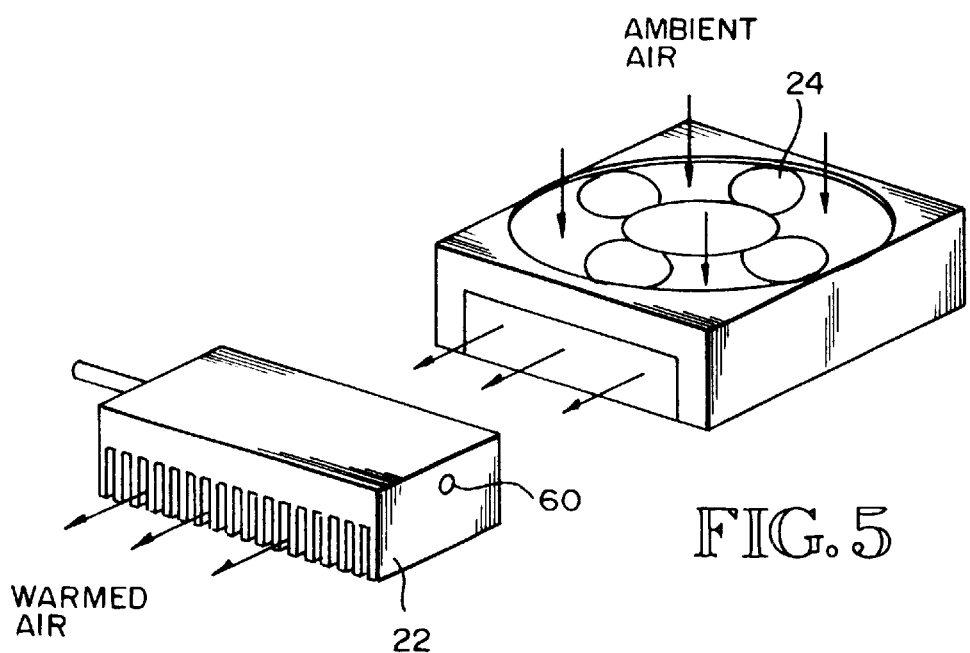
FIG. 5 is a partial diagram of the heat pipe, heat exchanger and fan of the cooling module.

The heat pipe 60 extends into the opening 56 of the heat sink 50 to a depth sufficient to define the thermal interface 21 (see FIG. 1) between the cooling module 20 and portable computer 10. Heat is dissipated from the heat sink 50 into the heat pipe 60. In one embodiment the heat pipe 60 includes a thermally conductive fluid which absorbs heat and is moved from an area of high temperature to an area of low temperature. In some embodiments thermal currents cause the movement. In other embodiments the fluid is actively circulated. Whether by passive or active phenomenon, the fluid moves within the heat pipe carrying heat from a hotter region adjacent to the heat sink 50 to a cooler region adjacent to the heat exchanger 22. In various embodiments different heat transfer substances and mediums are used. As shown in FIG. 5, the heat pipe 60 extends substantially through the heat exchanger 22 providing an efficient transfer of heat from the heat pipe 60. Preferably the heat exchanger 22 has a large surface area (e.g. fins) to maximize heat dissipation to the external environment.

In various embodiments the fan 24 is powered by varying sources. Referring to FIG. 6, in one embodiment, the cooling module 20 includes a power input connector 70. Correspondingly, the computer 10 includes a power output port 72. The power input 70 receives a power signal from the computer 10 through the power output port 72. In an exemplary embodiment, the power output port 72 is located adjacent to the heat interface port 54. When the cooling module 20 is detachably connected to the portable computer 10, such connection is established by the heat pipe 60 and a power input pin 74. In another embodiment (see FIG. 7) a wire connection 75 is implemented allowing the power input 70 and power output port 72 to be situated according to design without regard for the location of the thermal interface 21 (see FIG. 1). Where the computer is capable of providing the power to the cooling module, such power output port 72 alternatively is used for powering other devices, such as a light, external speakers or other electrical and peripheral devices.

Referring to FIG. 8, in another embodiment the cooling module 20 includes a resident power source 74, e.g., a battery. The battery 74 is replaceable and/or rechargeable, and supplies power to the cooling module 20. In a further variation, the cooling module 20 further includes a power output port 76 which couples to a power input port 78 of the portable computer 10. When the battery 74 is active, and the module power output port 76 is coupled to the computer 10, the battery 74 serves as a back-up power source for the portable computer 10.

Referring to FIG. 9, in other embodiments the cooling module 20 includes or is coupled to an AC adapter 80 that plugs into a wall outlet to receive AC line voltage. The AC adapter connects to an AC adapter inlet port 82 of the cooling module. The AC adapter 80 converts the signal into a DC signal for use by the fan 24. In a further variation, the AC adapter 80 also powers the portable computer 10. Specifically, the AC adapter 80 plugs into the inlet 82 of the cooling module 20. The cooling module 20 includes a pin 84 which plugs into the AC adapter port 86 of the portable computer 10. The power signal is received from the AC adapter 80 into the cooling module 20 which routes the signal to the fan 24 and to the computer 10, in series or in parallel. In a variation of this, a wire connection provides the power link between the cooling module power outlet pin 84 and the portable computer AC adapter port 86. This allows the power outlet 84 and AC adapter port 86 to be situated according to design with regard for location of the thermal interface 21.

In another embodiment, portable computer 10 supplies power to by way of a power supply port accessible from the case. Preferably, the port is capable of providing power to a variety of external devices such as a light, an audio speaker, and a cooling module that includes an integral fan, and numerous other external devices.

Effects of the Claimed Invention

One effect of the invention is that the increased cooling ability is achieved when desired (i.e., when the cooling module is attached and operated). Another effect is that the cooling module is configured in some embodiments with the AC adapter. The AC adapter provides power to both the computer and the cooling module in such embodiment. This allows the computer to have increased cooling ability while it is operated in an increased power mode. Another effect is that the cooling module in some embodiments provides a resident power source which can serve as a back-up power source for the portable computer. Another effect is that the cooling module in some embodiments receives power from the portable computer. This allows the operator the flexibility to decide whether to use the cooling module only when in high power mode or also in low power mode.

To conserve battery life, some processor manufacturers have adopted a high-speed (high power) mode which is in effect while the computer is coupled to an AC power source. When the computer is coupled to a battery source, the processor instead operates in a lower-speed (lower power) mode. Another effect of this invention is that the computer can operate in high power mode while coupled to a battery source, when the cooling module is attached. Another effect of the invention is that in some embodiments the computer is designed to normally run in low power mode. The thermal cooling ability built into the computer is designed to provide cooling at this thermal load. As a result, the computer weighs less as the required heat sink or other cooling mechanism is smaller and lighter in weight. When operating in the high power mode, the operator attaches the external cooling apparatus. This is done while operating on AC power or on a battery source at the operator's discretion.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A portable computing apparatus comprising:

a microcomputer;

a case housing the microcomputer, the case forming an external surface of the portable computing apparatus;

a heat sink housed within the case immediately adjacent to one or more vented openings in the external surface of the portable computing apparatus, the heat sink absorbing heat generated by the microcomputer and dissipating the heat via the vented openings; and, a cooling module located external to the case and having a heat pipe removably and directly insertable into a corresponding cavity of the heat sink exposed by a concentric hole of the external surface, the heat sink dissipating the heat when the cooling module is inserted therein via the vented openings and, through the heat pipe, the cooling module.

2. The apparatus of claim 1, in which the cooling module further comprises a heat exchanger, the heat pipe transferring heat from the heat sink to the heat exchanger.

3. The apparatus of claim 1, in which the cooling module comprises a fan to dissipate the heat to the external environment.

4. The apparatus of claim 1, further comprising a port accessible from the case, the port served with the external power, and wherein the cooling module connects to the port to receive the external power.

5. The apparatus of claim 1, in which the apparatus further comprises an AC adapter plug in port at the case, the cooling module being connected to the AC adapter plug in port.

6. The apparatus of claim 1, in which the cooling module comprises a resident power source, in which the resident power source serves as a back-up power source for the microcomputer.

7. The apparatus of claim 5, in which the cooling module includes a port into which an AC adapter plugs into the cooling module for providing external power to the cooling module and microcomputer.

8. A method for cooling a portable computer, comprising:

absorbing heat by a heat sink of the portable computer;

dissipating the heat via vented openings in the portable computer immediately adjacent to the heat sink;

removably connecting an external cooling module to the portable computer via a heat pipe removably and directly insertable into a corresponding cavity of the heat sink exposed by a hole within the portable computer;

receiving the heat from the portable computer into the cooling module;

dissipating the heat by the cooling module in addition to dissipating the heat via the vented openings; and, supplying external power to the portable computer.

9. The method of claim 8, in which the cooling module includes a fan, the step of dissipating comprising running the fan to dissipate heat into the external environment.

10. The method of claim 8, further comprising coupling the cooling module between the AC adapter and the portable computer, in which the AC adapter supplies the power to the cooling module and the portable computer, the AC adapter connecting to the cooling module and the cooling module connecting to an AC adapter port of the portable computer.

11. The method of claim 9, wherein the supplying action includes providing power to the fan from a power source resident to the cooling module.

12. The method of claim 9, wherein the supplying action includes providing power to the fan from a power signal received from the portable computer.

13. A cooling module for removably connecting to a portable computer, the cooling module connecting externally to the portable computer, the module comprising:

a heat pipe which directly extends into a cavity of a heat sink of the portable computer to absorb heat generated within the portable computer;

a heat exchanger which receives heat from the heat pipe;

a fan which blows air across the heat exchanger to dissipate heat, the heat also dissipated by the heat sink directly via vented openings of the portable computer immediately adjacent to the heat sink; and, a power source for supplying power to the portable computer.

14. The cooling module of claim 13, wherein the power source includes a battery for providing back-up power to the portable computer.

15. The module of claim 13, further comprising:

a power input port for connecting to the portable computer to receive power for driving the fan, the power being received by an input to the power source.

16. The module of claim 13, wherein the power source further comprises:

a power input port for connecting to an AC adapter; and a power output port for connecting to an AC adapter plug-in port of the portable computer;

wherein power is received from the power input port and routed to the fan to power the fan and to the power output port to power the portable computer.

* * * * *